Dec. 16, 1952  J. W. McDEVITT  2,621,767
OVERLOAD RELEASE CLUTCH
Filed Feb. 13, 1950
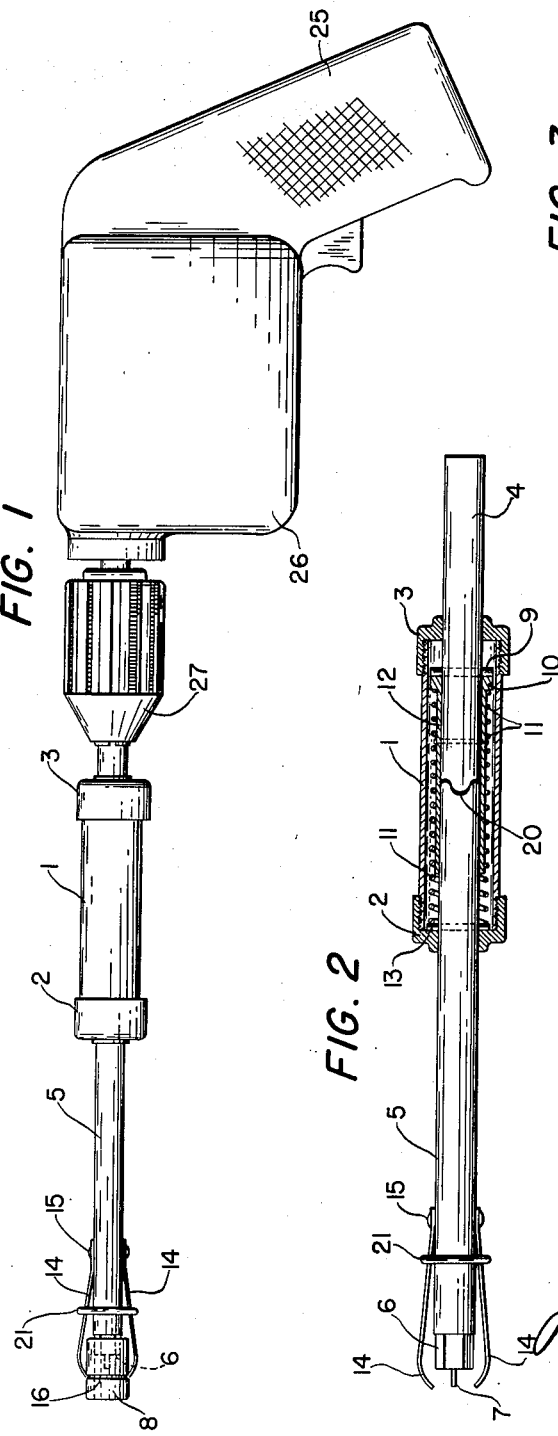
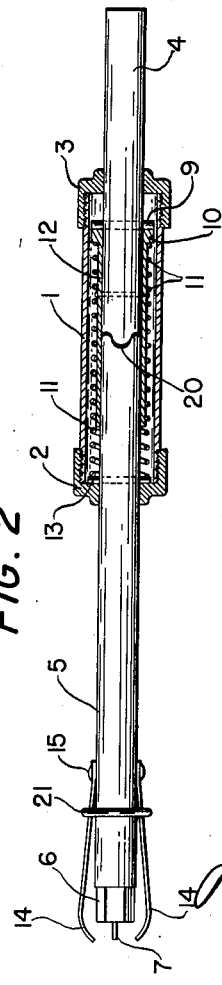
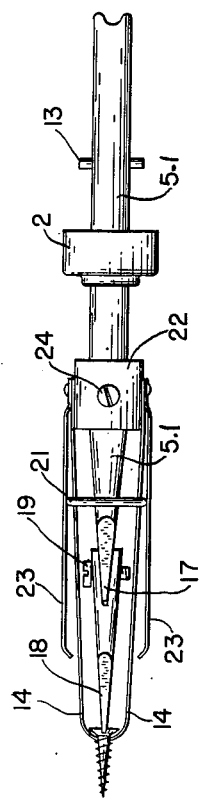
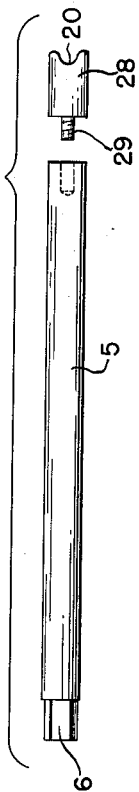
INVENTOR.
John W. McDevitt
BY
Bush Bush
ATTORNEYS.

Patented Dec. 16, 1952

2,621,767

UNITED STATES PATENT OFFICE 2,621,767

OVERLOAD RELEASE CLUTCH

John W. McDevitt, Davenport, Iowa

Application February 13, 1950, Serial No. 144,016

5 Claims. (Cl. 192—56)

My invention relates to improvements in tools and the objects of my invention are to provide a tool applicable to a plurality of bits such as screwdriver bits, wrench-holding bits, and which may be applied to drills, reamers and other tools; to provide means by which a convenient tool may be manually operated or motor-driven and a clutch engaged by pressure upon the handle of the tool or motor handle with the clutch jaws or members so constructed and arranged that they will automatically release at the final resistance which arises when a screw, nut or bolt is turned up to the limit of its practical travel in various given relations in which it is employed so as to prevent breakage of screws, nuts, bolts or of parts of the tool itself; to provide simple, easily interchangeable clutch members; to provide gripping members or retainers with a ring to hold the retainers in gripping position and additional retainers to hold the ring against displacement from the tool.

I accomplish these objects by the means shown in the accompanying drawings, in which—

Figure 1 is a side elevation of my appliance;

Figure 2 is a sectional detail of the sleeve, sleeve caps and spring, and showing the ratchet members engaged;

Figure 3 is a detail end view of one of the ratchet members;

Figure 4 is a detail showing a screwdriver bit in place of the wrench bit shown in Figure 1;

Figure 5 is a detail of an interchangeable clutch member.

Similar numerals refer to similar parts throughout the several views.

My appliance comprises a cylinder or sleeve 1 with end caps 2 and 3 threaded thereon. A shaft 4 is slidably mounted in a suitable bore formed in the cap 3 and a shaft 5 is mounted in a suitable bore formed in the cap 2 with the ends of the shafts meeting near the middle of the cylinder 1.

A stop 10 is mounted upon the shaft 4 and held in place by a pin 9 near one end of the cylinder. A stop 13 is placed upon the shaft 5 at the other end of the cylinder. Between the stops 10 and 13 a helical compression spring 11 is mounted upon a sleeve 12 into the opposite ends of which the shafts 4 and 5 project whereby pressure is exerted against the stops in opposite directions. The sleeve 12 may be secured to the shaft 4 by a pin or other suitable means. The adjacent ends of the shafts 4 and 5 are fitted with complementary clutch members 20 the teeth of which may be slightly tapered and rounded so that when the torque upon the clutch exceeds the maximum which is desirable for any given class of work, the clutch will automatically release thereby preventing breakage of screw heads or bolts or damage to the tool. A plurality of interchangeable clutch members of different angularity may be provided to meet varying requirements as to rigidity.

The shaft 4 may have its outer end mountable in the chuck 27 upon the shaft of a motor 26. A suitable handle 25 may be attached to the motor for convenient application of the tool to the work in hand, or a handle may be united to the shaft 4.

The shaft 5 may be in the form shown in Figures 1 and 2 in which the outer end is fitted with prongs and with hexagonal head 6 and a prong 7 by which it may engage a corresponding opening in a wrench head 8 of the ordinary socket type.

A peripheral groove 16 extends around the head 8 adapted to receive the inturned ends of retainer springs 14 and the opposite ends of which are secured to the shaft 5 by a bolt 15 or other means.

In the form shown in Figure 4 a screwdriver shaft 5.1 is substituted for the shaft 5 and has slidably mounted thereon a sleeve 22 which can be locked in position by a set screw 24.

To the sleeve 22 spring fingers 14 are secured which extend outwardly to the outer end of a screwdriver bit and are arranged to hold a screw in place upon the end of the screwdriver bit carried by the shaft 5.1 or formed integral therewith.

In order to accommodate different sized screws, a secondary bit 18 having a smaller and narrower point, may be secured upon the bit 17 by having arms in V-shape form straddling the point of the bit 17 and held in place by a set screw 19 extending through a suitable bore in the bit 17.

In order to hold a screw in place upon the bit, I mount a ring 21 which is slidable upon the spring arms 14 and will allow them to spread as the ring is moved toward the outer end of the bit and to draw them together as the ring is moved toward the sleeve 22.

In order to prevent displacement of the ring 21, I mount a second pair of spring fingers 23 upon the sleeve 22 which extend beyond the ring 21 and have their outer ends bent inwardly to contact the ring and prevent displacement thereof.

Applicant is aware that ratchet tools and screwdrivers having spring fingers to hold the screws in place upon the screwdriver bit have been in use heretofore and does not claim such separate elements broadly as such.

In the operation of my apparatus, it is assembled by mounting the shafts 4 and 5 with their ends in contact within the sleeve 1 and mounting the spring 11 around the sleeve 12 with the retainers or detents 10 and 13 secured in place with the spring 11 exerting sufficient pressure upon the retainers 10 and 13 to hold the ratchet 20 out of engagement.

The wrench head 8 may then be mounted upon the outer end of the shaft 5 and the ring 21 pushed outwardly to hold the prongs of the fingers 14 in the groove 6 of the head 8.

In case it is to be used as a screwdriver, a screwdriver shaft 5.1 is inserted in place of the shaft 5 and may have the auxiliary bit 18 mounted thereon as described.

The tool is then applied so that the wrench head 8 engages a nut or the head of a set screw intended to be driven thereby or if intended for use as a screwdriver, a screw is placed upon the point of the bit 17 or 18 and held in place by the fingers 14 and the ring 21 as described. Pressure upon the handle 25 then moves the motor and the shaft 4 lengthwise so that the clutch 20 is engaged and as the motor is started by a trigger or other common means, it turns the shafts 4 and 5 or 5.1 so as to set the nut or screw as desired.

When the nut has been tightened as far as it will go or the screw driven in its full length, the back pressure upon the clutch will move the shaft 4 and the motor 26 to the rear enough to release the clutch and prevent breakage.

Various modifications may be made in my apparatus without departing from the spirit of my invention and I do not limit my claims to the precise forms shown in the drawings.

I claim:

1. In a tool adapted to rotate the bit of a screwdriver, wrench or similar tool, the combination with a short cylinder having caps united to both ends thereof, of bores formed in the caps, a sleeve slidably mounted within the cylinder, coaxial front and rear shafts mounted in the caps of the cylinder and extending into the sleeve, coacting clutch members united to the inner ends of the shafts, said clutch members having a plurality of interengaging rounded teeth spaced stops mounted upon the shafts respectively within the cylinder to limit the outward travel of the shafts, and resilient means mounted around and along the sleeve arranged to exert pressure in opposite directions against the spaced stops.

2. In a tool of the class described, the combination with a short tube, of caps threaded upon the ends of the tube, bores formed in the caps, a sleeve slidably mounted within the tube, coaxial front and rear shafts slidably mounted in the caps of the tube, coacting clutch members united to the inner ends of the shafts, one of said shafts being rigidly united to the sleeve and the other being slidable therein, a helical compression spring surrounding the sleeve, and stops to limit the outward travel of the shafts mounted upon each of the shafts respectively abutting the ends of the spring whereby the spring can exert pressure in opposite directions upon the shafts thereby tending to separate the clutch members.

3. In a tool, the combination with a short tube, of caps threaded upon the ends of the tube, bores formed in the caps, a sleeve slidably mounted within the tube, coaxial front and rear shafts slidably mounted in the caps of the tube and extending into the sleeve, coacting clutch members removably united to the inner ends of the shafts, spaced stops mounted upon the shafts respectively within the tube to limit the outward travel of the shafts, a helical compression spring surrounding the sleeve arranged to exert pressure in opposite directions upon the spaced stops.

4. An overload release clutch including a short cylinder having caps united to both ends thereof, bores formed in the caps, a sleeve slidably mounted within the cylinder, coaxial front and rear shafts mounted in the caps of the cylinder, coacting clutch members united to the inner ends of the shafts, said clutch members having a plurality of interengaging rounded teeth whereby they may automatically release when a screw, nut, or bolt has been turned up to the limit of its practical travel so that the resistance thereof is sufficient to overcome the manual pressure which otherwise throws the clutch into engagement, one of said shafts being rigidly united to the sleeve and the other being slidable therein, stops mounted upon one of the shafts and upon the sleeve respectively to limit the outward travel thereof, and a helical compression spring surrounding the sleeve arranged to exert pressure in opposite directions upon the stops.

5. An automatic portable clutch including a short cylinder with annular caps at each end thereof, a sleeve slidably mounted within the cylinder, coaxial front and rear shafts mounted in the caps of the cylinder and extending into the sleeve, coacting clutch members united to the inner ends of the shafts, said clutch members having a plurality of interengaging rounded teeth whereby they may automatically release when sufficient to overcome manual pressure exerted upon the clutch members is encountered, stops mounted upon the shafts respectively to limit the outward travel thereof, and a helical compression spring surrounding the sleeve arranged to exert pressure in opposite directions upon the stops.

JOHN W. McDEVITT.

REFERENCES CITED

The following references are of record in the file of this patent:

UNITED STATES PATENTS

| Number | Name | Date |
|---|---|---|
| 1,415,687 | Oro | May 9, 1922 |
| 1,642,490 | Decker | Sept. 13, 1927 |
| 2,576,069 | Hoag et al. | Nov. 20, 1951 |